G. B. COLLIER.
HEATING APPARATUS.
APPLICATION FILED AUG. 7, 1906.
935,743.
Patented Oct. 5, 1909.
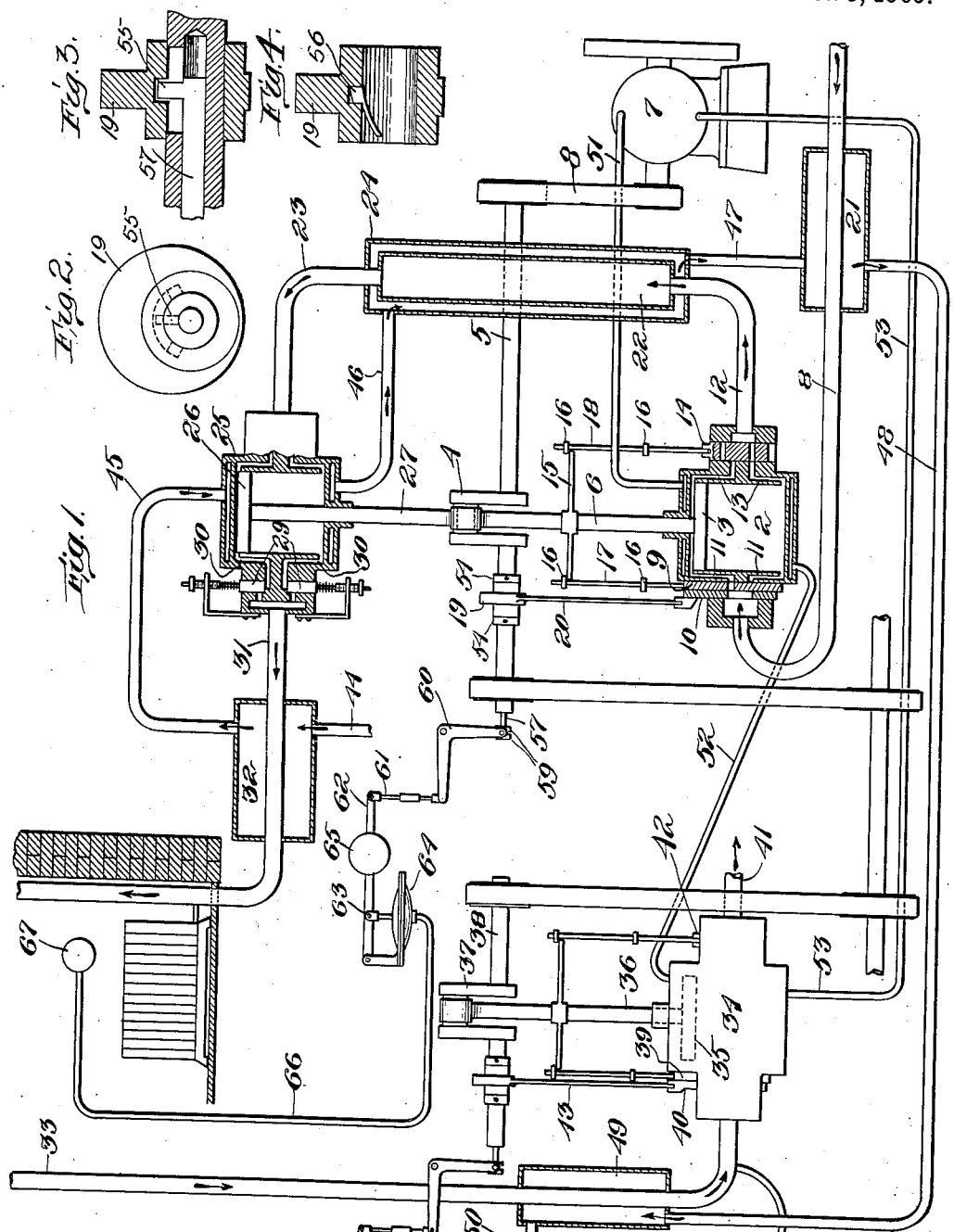

UNITED STATES PATENT OFFICE.

GUY B. COLLIER, OF KINDERHOOK, NEW YORK.

HEATING APPARATUS.

935,743.     Specification of Letters Patent.     Patented Oct. 5, 1909.

Application filed August 7, 1906. Serial No. 329,522.

*To all whom it may concern:*

Be it known that I, GUY B. COLLIER, citizen of the United States, and resident of Kinderhook, Columbia county, New York, have invented certain new and useful Improvements in Heating Apparatus, of which the following is a specification.

The invention relates to a heating apparatus in which the heat conveying or circulating medium is an elastic fluid such as air and in which the temperature of the fluid is raised to the degree required by first expanding the fluid and then compressing it, heat being supplied to the fluid between its admission to the expanding mechanism and its admission to the compressing mechanism so that the heating of the fluid is effected by doing a comparatively small amount of work thereon.

In practicing the invention the air or other heat carrying fluid of the system is taken into an expanding mechanism where it is expanded and is at the same time subjected to heat so that the expansion is approximately isothermal. The expanded air is then conducted to a compressing mechanism by which it is compressed and delivered at a higher pressure than the pressure at which it was taken into the expanding mechanism. On its way from the expanding mechanism to the compressing mechanism the expanded air is preferably subjected to the action of a heating agent so that its temperature is raised by reason of the absorption of heat from the heating agent. In compressing the air a certain amount of heat is supplied thereto by reason of the work done upon it and the heat which was in the air at the time it was taken into the expanding mechanism and also any heat absorbed during expansion or during the passage of the air from the expanding mechanism to the compressing mechanism, or during both intervals, is raised to a higher temperature level. The compressed air with its high temperature heat which is delivered from the compressing mechanism, is passed through a circulating conduit where it may be utilized for heating purposes either by passing it through the radiators or piping of a heating system or by passing it through a device for heating the water of a hot water heating system or in any other desired manner. If found desirable a portion of the air may be utilized for ventilating purposes. The compressed air after passing through the circulating conduit is utilized to assist or supplement the action of the motor which furnishes the power for operating purposes, thereby reducing the work required to be done by such motor.

The quantity of heat at a temperature suitable for heating purposes which may be obtained by the use of an apparatus having the general mode of operation above outlined, is so great in proportion to the power required for operating purposes, that the apparatus provides an economical means for providing heat to be used for heating purposes.

The economy of the apparatus may be increased by utilizing the waste heat from the motor used for operating purposes to supply heat to the incoming air on its way to the expanding mechanism and may be further increased by also utilizing this waste heat in heating the air during expansion during its passage from the expanding to the compressing mechanism and in supplying heat to the air during its passage through various other parts of the apparatus.

For the purpose of illustration I have shown diagrammatically in the accompanying drawings, one form of apparatus embodying the various features of my invention.

The various features of the invention will be pointed out in the claims and will be readily understood from the following detailed description of the apparatus indicated in the drawings.

In these drawings—Figure 1 is a diagrammatic view illustrating a system in which a gas or hydrocarbon engine is used as the operating motor and in which the high temperature air is circulated through the radiators and piping of a heating system and forms the circulating heat conveying medium of the heating system. Figs. 2, 3 and 4 are details of parts of the devices shown for regulating and governing the amount of compression effected in the operation of the apparatus and for governing the delivery of compressed air from the circulating conduit to the motor in which said air is utilized.

In the apparatus shown the expanding mechanism is in the form of a cylinder 2 within which reciprocates a piston 3. The piston is reciprocated by a crank 4 carried by a shaft 5 and connected with the piston rod 6. The shaft 5 is driven from a gas or hydrocarbon engine indicated at 7 through a belt 8.

Air is supplied to the expansion cylinder through an intake pipe 8 and the admission of the air to either side of the piston is controlled by a main valve 9 and cut-off valve 10, which control the communication between the intake pipe 8 and the intake ports 11. The expanded air is delivered from the expanding cylinder 2 to a delivery pipe 12 through ports 13, the opening and closing of which is controlled by a delivery valve 14. The main valve 9 and the delivery valve 14 are shifted at each end of the stroke of the piston by means of arms 15 projecting from the valve rod 6 and arranged to operate upon tappets 16 carried by the valve rods 17 and 18. The cut-off valve 10 is operated to cut-off communication between the intake pipe 8 and the ports 11 at the proper point in the stroke of the piston in either direction by means of an eccentric 19 carried by the shaft 5 and connected with the valve by an eccentric strap and rod 20.

During a portion of the stroke of the piston 3 in either direction, air is taken into the cylinder back of the piston through the intake pipe 8, valves 9 and 10, and port 11, and then the supply of air is cut off by the closing of the valve 10. During the remainder of the stroke of the piston, the air back of the piston expands, the amount of expansion depending upon the point at which the cut off valve is operated. On the return stroke of the piston this expanded air is delivered through one of the ports 13 to the delivery pipe 12. The incoming air as it passes through the intake pipe 8 is subjected to the action of a heating agent by means of a heating device 21 through which the hot exhaust products from the engine 7 are circulated and absorbs heat from this heating agent. During the expansion of the air it is also subjected to the action of a heating agent circulated through a jacket formed around the expanding cylinder and absorbs heat from this heating agent so that the expansion of the air is approximately isothermal. The expanded air is conducted from the expansion cylinder to the expanding mechanism through the pipe 12, receiver 22 and pipe 23, the air as it passes through this conduit being subjected to the action of a heating agent which is circulated through a jacket 24 surrounding the receiver 22. Thus the air in its passage from the expanding mechanism to the compressing mechanism absorbs heat from the heating agent in the jacket 24 and will or may be delivered to the compressing mechanism at a temperature higher than that at which it entered the expanding mechanism.

The compressing mechanism in the form shown consists of a cylinder 25 within which reciprocates a piston 26. The cylinder 25 is arranged on the opposite side of the crank shaft 5 from the expansion cylinder 2 and the piston 26 is connected with the crank pin 4 by the piston rod 27 which forms a continuation of the piston rod 6. With the compressing and expanding mechanisms thus connected the expansion of the air in the expanding cylinder acts to force the piston 20 forward during its compression stroke, thereby reducing the power required to be furnished by the engine 7 in operating the compressing mechanism.

Air is supplied to the compression cylinder from the pipe 23 through intake valves which may be ordinary pocket valves (not shown), one of which opens to admit air back of the piston immediately the piston starts forward, remains open during the entire stroke of the piston in this direction, and immediately closes as the piston starts on its stroke in the opposite direction. The air is delivered from the compression cylinder through valves 29 which control the communication between the ports 30 leading from opposite ends of the cylinder and the delivery pipe 31 which leads to or forms a part of the conduit through which the air is circulated. The valves 29 are valves which may be set to open when the pressure in front of the piston reaches a predetermined point. As the piston advances therefore the expanded air delivered to the cylinder through the pipe 23 on its stroke in the opposite direction, is compressed until its pressure reaches a predetermined point when the valve 29 opens and this compressed air is delivered into the pipe 31. In thus compressing the air a certain amount of heat is imparted to it by reason of the work done upon it during the compression and the heat which was in the air originally taken into the system and the heat which was absorbed by the air on its way to the compression mechanism, is raised to a temperature level suitable for use for heating purposes.

The compressed air with its high temperature heat is delivered through the pipe 31 and on its way to the place of use may be subjected to the action of a heating agent in a heating device 32 through which the pipe 31 passes. The compressed air with its high temperature heat may be circulated through the radiators or heating coils of a heating system as indicated in the drawings, may be utilized to transfer its heat to the hot water of a hot water heating system or may be otherwise used for heating purposes, or a part of the air may be used for heating purposes and a part for ventilating purposes.

The compressed air after having delivered its high temperature heat at the place of use, is delivered from the circulating conduit through a pipe 33 to a motor which is so connected with the compressing mechanism that it assists in driving this mechanism and thus reduces the power required to be supplied by the engine 7. The form of motor shown consists of a cylinder 34 within which reciprocates a piston 35. The piston 35 may be connected in any suitable manner so that the pressure exerted on the piston by the compressed air delivered through the pipe 33 will tend to operate the compressing mechanism. As shown the piston 35 is connected by a piston rod 36 with a crank 37 secured to a crank shaft 38 and the shaft 38 is connected by suitable belting and shafting with the crank shaft 5 which drives the compressing mechanism.

The delivery of air from the pipe 33 to the cylinder 34 is controlled by a main valve 39 and a cut off valve 40. The air is exhausted from the cylinder 34 through a pipe 41, communication to the exhaust pipes from this pipe being controlled by a valve 42. The main valve 39 and the exhaust valve 42 are shifted at each end of the stroke of the piston 35 by devices such as have already been described for operating the main and delivery valves of the expansion cylinder 2. The cut-off valve 40 is operated by an eccentric similar to the eccentric 19 already described which is connected to the valve by an eccentric strap and rod 43. The operation of the cut off valve 40 is so timed that the proper volume of air will be delivered to the cylinder 34 at each stroke of the piston to maintain the desired pressure in the circulating conduit.

The efficiency of the motor to which the air is delivered from the circulating conduit may be increased by subjecting the air as it passes to the motor to the action of a heating agent and also by subjecting the air during its expansion in the motor to a heating agent so that the expansion approximates isothermal expansion. This heating may be economically done and the economy of the entire apparatus increased in cases where steam, gas, or hydrocarbon engines are used for operating purposes by utilizing the waste heat from the motor as the heating agent.

In the apparatus shown the exhaust products from the engine 7 are led through the pipe 44 to the heating device 32, thence through a pipe 45 to the jacket of the cylinder 25, thence through a pipe 46 to the jacket 24 of the receiver 22, thence through a pipe 47 to the heating device 21, thence through a pipe 48 to the heating device 49 through which the pipe 33 passes and are discharged from this heating device through a pipe 50. The heating agent for acting upon the air during its expansion in the expanding cylinder 2 and in the motor cylinder 34, consists of the water circulated through the jacket of the combustion cylinder of the engine 7. This water is led from the water jacket of the engine cylinder through a pipe 51 to the jacket of the cylinder 2, thence through a pipe 52 to the jacket of the cylinder 34, and after imparting its heat to the air passing through the cylinders 2 and 34, is returned to the jacket of the engine cylinder through a pipe 53.

In an apparatus of the character described the range of temperature through which the air should be raised by the compression mechanism in order to secure a given temperature in the air delivered, will vary with the conditions under which the apparatus is being used. For instance, if the outside air is at a low temperature, the amount of compression required in order that the air may be delivered by the compressor at the required temperature, will be greater than the amount of compression required if the outside air is at a higher temperature. The amount of compression may be varied by varying the pressure at which the air is delivered, the expansion remaining constant or it may be varied by varying the amount of expansion, the pressure to which the air is raised remaining constant, or variation may be secured by a combination of both these methods. In the construction shown the compressing mechanism delivers at a constant pressure after the delivery valves have been set and the regulation of the compression is effected by varying the amount of expansion. When the apparatus has been adjusted or regulated so as to operate properly under the conditions existing at the time of its use, its operation should be governed in conformity with the use to which it is put. For instance, if the apparatus is being used for supplying heated air for the purposes of heating a building, it may be desirable to govern the operation of the apparatus so that a substantially constant temperature will be maintained in the apartments being heated.

In the apparatus shown the regulation and governing of the compressing mechanism is effected by regulating and governing the cut off of the supply of air to the expanding cylinder and one form of means for adjusting and controlling the cut off is indicated.

The amount of expansion effected in the expansion cylinder depends upon the point in the stroke of the piston 3 at which the cut off valve 10 acts to cut off the supply of air through the intake pipe 8 and the point at which the valve thus acts depends upon the position of the eccentric 19 upon the shaft 5. The expansion effected in the expanding cylinder may therefore be regulated and governed by regulating and governing the position of the eccentric 19 upon the shaft 5. For this purpose the eccentric is loosely mounted upon the shaft between the collars 54 and is held in position upon the shaft by means of a pin 55 which engages a spiral groove 56 formed in the bore of the eccentric. The pin 55 is secured upon the end of a rod 57 which is mounted within the shaft 5, the pin projecting through a longitudinal slot 58 formed in the shaft. The rod projects beyond the end of the shaft and is provided with two collars 59 which engage opposite sides of a pin projecting from one arm of a bell crank lever 60. The other end of the bell crank lever is connected by means of an adjustable link 61 with a lever 62. The lever 62 is connected by a link or pin 63 with a flexible diaphragm within a casing 64 and is provided with an adjustable weight 65 by which the pressure transmitted from the lever to the diaphragm may be regulated. The chamber within the casing below the diaphragm is connected by a pipe 66 with a thermostat 67 arranged with in the building which is to be heated, and constructed in any usual or well known manner to vary the pressure within the pipe 66 according to the temperature of the thermostat.

By adjusting the weight 65 upon the arm 62 the pressure on the diaphragm in the casing 64 may be adjusted to counterbalance the pressure on the under side of the diaphragm corresponding to the desired temperature at the thermostat. By adjusting the link 61 the cut-off valve may be set to regulate the expansion to suit the conditions under which the apparatus is to operate at any particular time. After the eccentric has been thus set, the thermostat will operate to control the governing mechanism to maintain a substantially constant temperature at the thermostat. If the temperature at the thermostat falls, the eccentric will be shifted to cause the cut-off valve to operate at an earlier point in the stroke of the expansion piston. This will result in a greater expansion of the air and therefore a greater compression with the corresponding rise in the temperature of the air passing through the circulating conduit. If the temperature at the thermostat rises, the eccentric will be operated to cause the cut-off valve to operate later in the stroke of the piston. This will result in less expansion of the air in the expanding cylinder and consequently less compression in the compression cylinder with a corresponding fall in the temperature of the air in the circulating conduit.

In an apparatus constructed as shown to maintain a constant pressure in the circulating conduit, the amount of air delivered from the circulating conduit to the motor within which this air is utilized, should be varied to correspond with any variation which is made in the pressure of the system and after having been once regulated the delivery of the air should be governed to maintain the desired pressure within the circulating conduit. In order that the delivery of the air from the pipe 33 to the motor cylinder 34 may be thus regulated and governed, the eccentric which operates the cut-off valve 40 for the cylinder 34 is connected with a regulating and controlling mechanism similar to that which is connected to the eccentric 19 already described. The casing 64' for this governing and regulating mechanism is connected by a pipe 66' with the delivery pipe 33 near the point where it enters the valve chamber of the cylinder 34. With the casing 64' thus connected a rise in pressure in the delivery pipe 33 will cause the cut-off valve to act at a later point in the stroke of the piston 35 so that a greater volume of air will be taken into the cylinder with a resulting tendency to lower the pressure in the pipe 33. A fall in the pressure in the pipe 33 will result in an earlier action of the cut-off valve so that a less volume of air will be delivered into the cylinder 34 with a resulting tendency to cause a rise in the pressure in the pipe 33. Thus the governor will act to control the cut-off valve so as to maintain a substantially constant pressure in the pipe 33.

Instead of providing the compression cylinder with automatically operating delivery or release valves, the cylinder might be provided with main and release valves similar in construction to the main and cut-off valves shown in connection with cylinders 2 and 34, these valves being operated to release the air compressed with the cylinder at a certain point in the stroke of the piston. In such case the amount of compression and the temperature in the system might be regulated by regulating the action of the release valve to operate at different points in the stroke of the compression piston. In this case the pressure within the circulating conduit would vary according to the regulation of the operation of the release valve and in order to maintain the proper pressure in the circulating conduit the regulating and governing mechanism for the cut-off valve of the cylinder 34 should be controlled from the same thermostat or other controlling means employed for controlling the governing and regulating mechanism for the release valve of the compression cylinder. This controlling and regulating mechanism for the release valve of the compression cylinder might be of the same construction as the controlling and regulating mechanism shown for controlling and regulating the cut-off valves 10 and 40.

Instead of controlling the operation of the apparatus from a thermostat as indicated in the drawings, the operation of the governing mechanism may be controlled in any desired manner to suit the requirements of the use to which the apparatus is put.

It will be understood that the specific construction of the expanding mechanism, compressing mechanism, and means for utilizing the compressed air delivered from the circulating conduit, and that the specific construction of the various devices and mechanisms forming parts of the apparatus, are not material and that the mechanisms and devices shown in the drawings are shown merely for the purpose of illustrating diagrammatically the construction and mode of operation of an apparatus embodying the features of the invention.

Without attempting to point out in detail the various forms of apparatus in which my invention may be embodied, what I claim and desire to secure by Letters Patent is:—

1. A heating apparatus comprising fluid expanding mechanism provided with means for heating the fluid during expansion, a fluid compressing mechanism for compressing the fluid beyond the pressure at which it is taken into the expanding mechanism, a circulating conduit to which the compressed fluid is delivered, and means for utilizing the compressed fluid after passing through the circulating conduit for reducing the work required for operating purposes.

2. A heating apparatus comprising fluid expanding mechanism provided with means for heating a fluid during expansion, a fluid compressing mechanism for compressing the fluid beyond the pressure at which it is taken into the expanding mechanism, a circulating conduit to which the compressed fluid is delivered, and a motor to which the circulating conduit delivers the compressed fluid said motor being actuated by the compressed fluid.

3. A heating apparatus comprising means for expanding a fluid approximately isothermally, means for compressing the expanded air adiabatically beyond its original pressure, means for circulating the high temperature compressed fluid for heating purposes, and means for utilizing the compressed fluid delivered from the circulating means in effecting the compression.

4. A heating apparatus comprising fluid expanding mechanism, a fluid compressing mechanism for compressing the fluid beyond the pressure at which it is taken into the expanding mechanism, means for subjecting the fluid to the action of a heating agent on its way to the compressing mechanism, a circulating conduit to which the compressed fluid is delivered, and means for utilizing the compressed fluid delivered from the circulating conduit in effecting the compression.

5. A heating apparatus comprising fluid expanding mechanism, a fluid compressing mechanism for compressing the fluid beyond the pressure at which it is taken into the expanding mechanism, means for subjecting the fluid to the action of a heating agent between the expansion and compression mechanisms, a circulating conduit to which the compressed fluid is delivered, and means for utilizing the compressed fluid delivered from the circulating conduit for reducing the work required for operating purposes.

6. A heating apparatus comprising fluid expanding mechanism, means for subjecting the fluid to the action of a heating agent during expansion, a fluid compressing mechanism for compressing the fluid beyond the pressure at which it is taken into the expanding mechanism, a circulating conduit to which the compressed fluid is delivered, and means for utilizing the compressed fluid delivered from the circulating conduit for reducing the work required for operating purposes.

7. A heating apparatus comprising fluid expanding mechanism, a fluid compressing mechanism for compressing the fluid beyond the pressure at which it is taken into the expanding mechanism, means for subjecting the fluid to the action of a heating agent on its way to the compressing mechanism, a circulating conduit to which the compressed fluid is delivered, a motor for operating the compressing means, and a motor to which the circulating conduit delivers the compressed fluid for supplementing the action of the prime motor.

8. A heating apparatus comprising fluid expanding mechanism, a fluid compressing mechanism for compressing the fluid beyond the pressure at which it is taken into the expanding mechanism, means for subjecting the fluid to the action of a heating agent on its way to the expanding mechanism, a circulating conduit to which the compressed fluid is delivered, a prime motor for driving the compressing mechanism, an auxiliary motor connected to operate the compressing mechanism to which the circulating conduit delivers the compressed fluid.

9. A heating apparatus comprising fluid expanding mechanism, a fluid compressing mechanism for compressing the fluid beyond the pressure at which it is taken into the expanding mechanism, a prime motor for driving the compressing mechanism, means for subjecting the fluid to the heating action of the exhaust from the motor on its way to the compressing mechanism, a circulating conduit to which the compressed fluid is delivered, and an auxiliary motor to which the circulating conduit delivers the compressed fluid said motor being actuated by the compressed fluid.

10. A heating apparatus comprising fluid expanding mechanism, a fluid compressing mechanism for compressing the fluid beyond the pressure at which it is taken into the expanding mechanism, a circulating conduit to which the compressed fluid is delivered, means for utilizing the compressed fluid delivered from the circulating conduit for reducing the work required for operating purposes, means for governing the amount of compression, and means for governing the delivery of compressed fluid from the circulating conduit.

11. A heating apparatus comprising fluid expanding mechanism, a fluid compressing mechanism for compressing the fluid beyond the pressure at which it is taken into the expanding mechanism, a circulating conduit to which the compressed fluid is delivered, means for utilizing the compressed fluid delivered from the circulating conduit for reducing the work required for operating purposes, means for regulating the amount of compression, and means for regulating the delivery of compressed fluid from the circulating conduit.

12. A heating apparatus comprising fluid expanding mechanism, fluid compressing mechanism for compressing the fluid beyond the pressure at which it is taken into the expanding mechanism, a circulating conduit to which the compressed fluid is delivered, means for governing the amount of compression, and means for governing the delivery of compressed fluid from the circulating conduit.

13. A heating apparatus comprising fluid expanding mechanism, fluid compressing mechanism for compressing the fluid beyond the pressure at which it is taken into the expanding mechanism, a circulating conduit to which the compressed fluid is delivered, means for regulating the amount of compression, and means for regulating the delivery of the compressed fluid from the circulating conduit to conform to the action of the compressing mechanism.

14. A heating apparatus comprising fluid expanding mechanism, a fluid compressing mechanism for compressing the fluid beyond the pressure at which it is taken into the expanding mechanism, means for subjecting the fluid to the action of a heating agent on its way to the compressing mechanism, a circulating conduit to which the compressed fluid is delivered, means for regulating the amount of compression, and means for regulating the delivery of compressed fluid from the circulating conduit to conform to the action of the compressing mechanism.

15. A heating apparatus comprising fluid expanding mechanism, a fluid compressing mechanism for compressing the fluid beyond the pressure at which it is taken into the expanding mechanism, means for subjecting the fluid to the action of a heating agent on its way to the compressing mechanism, a circulating conduit to which the compressed fluid is delivered, means for governing the amount of compression, and means for governing the delivery of compressed fluid from the circulating conduit.

16. A heating apparatus comprising fluid expanding mechanism, a fluid compressing mechanism for compressing the fluid beyond the pressure at which it is taken into the expanding mechanism, means for subjecting the fluid to the action of a heating agent on its way to the compressing mechanism, a circulating conduit to which the compressed fluid is delivered, means for regulating the amount of compression, means for regulating the delivery of compressed fluid from the circulating conduit to conform to the action of the compressing mechanism, means for governing the amount of the compression, and means for governing the delivery of compressed fluid from the circulating conduit.

17. A heating apparatus comprising fluid expanding mechanism provided with means for heating the fluid during expansion, a fluid compressing mechanism for compressing the fluid beyond the pressure at which it is taken into the expanding mechanism, a circulating conduit to which the compressed fluid is delivered, a prime motor for operating the compressing mechanism, and means for utilizing the compressed fluid after passing through the circulating conduit for reducing the work required of the prime motor.

18. A heating apparatus comprising fluid expanding mechanism provided with means for heating the fluid during expansion, a fluid compressing mechanism for compressing the fluid beyond the pressure at which it is taken into the expanding mechanism, a prime motor for operating the compressing mechanism, a circulating conduit to which the compressed fluid is delivered, and a motor to which the circulating conduit delivers the compressed fluid said motor being actuated by the compressed fluid.

19. A heating apparatus comprising fluid expanding mechanism, fluid compressing mechanism for compressing the fluid beyond the pressure at which it is taken into the expanding mechanism, a prime motor for operating the compressing mechanism, a circulating conduit to which the compressed fluid is delivered, means for utilizing the compressed fluid delivered from the circulating conduit for reducing the work required from the prime motor, means for governing the amount of compression, and means for governing the delivery of compressed fluid from the circulating conduit.

20. A heating apparatus comprising fluid expanding mechanism, a fluid compressing mechanism for compressing the fluid beyond the pressure at which it is taken into the expanding mechanism, a prime motor for operating the compressing mechanism, a circulating conduit to which the compressed fluid is delivered, means for utilizing the compressed fluid delivered from the circulating conduit for reducing the work required from the prime motor, means for adjusting the apparatus to vary the amount of compression, and means for adjusting the delivery of compressed fluid from the circulating conduit.

21. A heating apparatus comprising fluid expanding mechanism, a fluid compressing mechanism for compressing the fluid beyond the pressure at which it is taken into the expanding mechanism, means for subjecting the fluid to the action of a heating agent on its way to the compressing mechanism, a prime motor for operating the compressing mechanism, a circulating conduit to which the compresed fluid is delivered, means for governing the amount of compression, and means for governing the delivery of compressed fluid from the circulating conduit.

In witness whereof, I have hereunto set my hand, this 3rd day of August 1906.

GUY B. COLLIER.

In the presence of—
 NATHANIEL B. WALES,
 IRA L. FISH.